(12) United States Patent
Scheins

(10) Patent No.: US 11,061,152 B2
(45) Date of Patent: Jul. 13, 2021

(54) METHOD AND DEVICE FOR THE TWO-DIMENSIONAL IMAGING OF A POSITRON EMITTER DISTRIBUTION OF WEAKLY POSITRON-ABSORBING OBJECTS

(71) Applicant: FORSCHUNGSZENTRUM JUELICH GMBH, Juelich (DE)

(72) Inventor: Juergen Scheins, Aldenhoven (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 53 days.

(21) Appl. No.: 16/490,122

(22) PCT Filed: Mar. 6, 2018

(86) PCT No.: PCT/DE2018/000055
§ 371 (c)(1),
(2) Date: Aug. 30, 2019

(87) PCT Pub. No.: WO2018/184610
PCT Pub. Date: Oct. 11, 2018

(65) Prior Publication Data
US 2020/0072987 A1 Mar. 5, 2020

(30) Foreign Application Priority Data

Apr. 6, 2017 (DE) .......................... 102017003353.6

(51) Int. Cl.
*G01T 1/29* (2006.01)
(52) U.S. Cl.
CPC ................. *G01T 1/2985* (2013.01)
(58) Field of Classification Search
None
See application file for complete search history.

(56) References Cited

U.S. PATENT DOCUMENTS

| 5,063,293 | A | * | 11/1991 | Rich | ....................... H01J 37/26 |
| | | | | | 850/43 |
| 5,866,907 | A | | 2/1999 | Drukier et al. | |
| 2014/0242600 | A1 | | 8/2014 | Carpenter et al. | |
| 2016/0116614 | A1 | | 4/2016 | Watson | |
| 2018/0011159 | A1 | * | 1/2018 | Watson | .................. A61B 6/037 |

FOREIGN PATENT DOCUMENTS

DE 3208178 A1 9/1983

OTHER PUBLICATIONS

Hammer, et al.: "Use of a Magnetic Field to Increase the Spatial Resolutio of Positron Emission Tomography," *Medical Physics* 21, 12: 1917-1920 (Dec. 1, 1994), XP000496873.

Kennedy, et al.: "Super-Resolution in PET Imaging," *IEEE Transactions on Medical Imaging* 25, 2: 137-147 (Feb. 2006).

\* cited by examiner

*Primary Examiner* — Hugh Maupin
(74) *Attorney, Agent, or Firm* — Leydig, Voit & Mayer, Ltd.

(57) ABSTRACT

A method for two-dimensional imaging of a positron emitter distribution in objects to be examined, wherein the object to be examined includes a positron emitter, includes positioning the object to be examined in a magnetic field, wherein the positrons leaving the object to be examined follow the course of the magnetic field and strike a positron absorber which is likewise positioned in the magnetic field and which, upon interaction with the positrons, allows localization of the impact points of the positrons on the positron absorber.

20 Claims, 2 Drawing Sheets

METHOD AND DEVICE FOR THE TWO-DIMENSIONAL IMAGING OF A POSITRON EMITTER DISTRIBUTION OF WEAKLY POSITRON-ABSORBING OBJECTS

CROSS REFERENCE TO RELATED APPLICATIONS

This application is a U.S. National Phase Application under 35 U.S.C. § 371 of International Application No. PCT/DE2018/000055, filed on Mar. 6, 2018, and claims benefit to German Patent Application No. DE 10 2017 003 353.6, filed on Apr. 6, 2017. The International Application was published in German on Oct. 11, 2018 as WO 2018/184610 under PCT Article 21(2).

FIELD

The invention relates to a method and a device for the two-dimensional imaging of a positron emitter distribution of weakly positron-absorbing objects.

BACKGROUND

The prior art has so far been represented by positron emission tomography [PET] as a universal three-dimensional imaging method [1], which can be used in particular for the quantification of bio-dynamic metabolic processes (in vivo). Various fields of application are found, for example, in pre-clinical research, human medicine, neurosciences and in the exploration of the metabolic processes of plants. Depending on the field of application, a plurality of commercial and non-commercial PET scanners of different types exists. MR/PET hybrid detector systems are also used [2] as the most recent development for achieving optimum synergy between metabolic information by means of PET with physico-technically induced lower spatial resolution (typically 2-5 mm) as well as morphological or structural information by means of magnetic resonance tomography [MRT], with spatially very good resolution (typically <1 mm).

Furthermore, the method of positron attenuation tomography exists, in which examination objects can be characterized with regard to their positron absorption properties or positron annihilation properties by parallel positron rays of a well-defined positron source [3]. A homogeneous, strong magnetic field with axial alignment to the PET scanner is required for this purpose, as is generally the case for MR/PET hybrid scanners.

The precise quantification of the underlying positron-emitter density distribution of an object using the PET methodology presupposes that as far as possible all emitted positrons in the immediate vicinity of the true emission point convert by annihilation into two 511 keV gamma quanta flying in the opposite direction and then become detectable by a PET scanner. In so doing, use is made of the fact that the gamma quanta can reach the examination object virtually unimpeded, while the positrons in matter can only cover extremely small distances between emission site and annihilation site. The mean free path length of the positrons depends strongly on the electron density distribution of the environment and on the kinetic energy of the emitted positrons, which differ for different isotopes.

From this mechanism of action, relevantly increased probabilities for the escape of positrons from the examination object ensue for large-surface objects with a simultaneously low volume and/or low material density, without triggering a corresponding annihilation process. The problem arises, for example, with thin sections of biological material or biological material having a small thickness, for example leaves or thin sections of organ parts, for example brains. The escaped positrons evade direct detection by the PET methodology, so that here the quantification fundamentally leads to a systematic underestimation of the true positron-emitter density distributions. An estimation of the escape probability of the positrons to correct the tomographically reconstructed positron-emitter density distribution is difficult since they depend very sensitively on the precise electron density distribution and the true positron-emitter density distribution of the examination object. However, both distributions can generally be characterized only inadequately by the limited resolution of the available PET scanners.

SUMMARY

In an embodiment, the present invention provides a method for two-dimensional imaging of a positron emitter distribution in objects to be examined, wherein the object to be examined includes a positron emitter. The method includes positioning the object to be examined in a magnetic field, wherein the positrons leaving the object to be examined follow the course of the magnetic field and strike a positron absorber which is likewise positioned in the magnetic field and which, upon interaction with the positrons, allows localization of the impact points of the positrons on the positron absorber.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
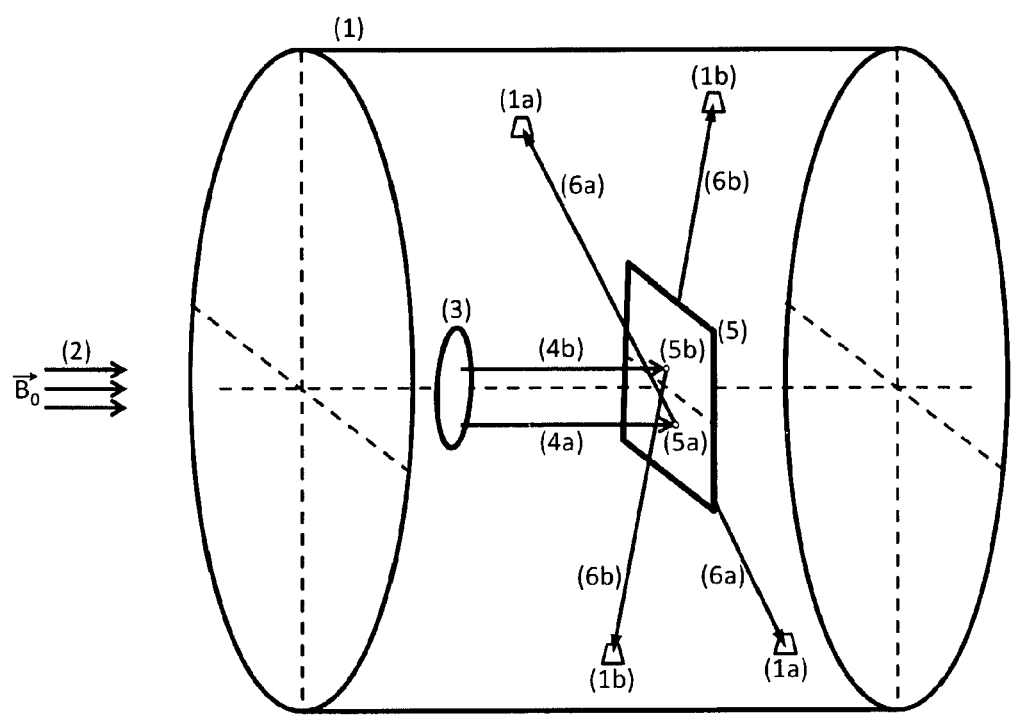
FIG. 1 illustrates a device according to an embodiment of the invention.

Embodiments of the invention provide methods and devices with which a two-dimensional quantitative density distribution of positron emitters in examination objects with a low probability of annihilation of the emitted positrons within the examination object is made possible. The images obtained should also be able to be generated without tomographic reconstruction methods.

For examination objects with a low $e^+e^-$ annihilation probability within the examination object, a method is provided which enables an improved quantification of the distribution of positron emitters in comparison with the PET methodology. The methods and the devices are usable in particular for large-surface objects with a simultaneously low volume and/or objects with a low material density, and at the same time provide more accurate results for the positron-emitter density distribution of the examination object.

With the methods and the devices according to the invention, it is now possible to measure the two-dimensional quantitative density distribution of positron emitters in examination objects with a low probability of annihilation of the emitted positrons within the examination object. The images obtained can also be generated without tomographic reconstruction methods. For examination objects with a low $e^+e^-$ annihilation probability within the examination object, a method is provided which enables an improved quantification of the distribution of positron emitters in comparison with the PET methodology. The method and the device provide, in particular for large-surface objects with a simultaneously low volume and/or objects with a low material density, images with increased accuracy of the positron emitter density distribution of the examination object as compared with the method mentioned at the outset.

In the following, embodiments of the invention are described in their general form, without this being interpreted restrictively.

For an object to be examined, in particular a weakly positron-absorbing object, the positron-emitter density distribution in an object is produced, according to embodiments of the invention, as a two-dimensional image in the form of a projection.

In principle, any object can be used as the object to be examined, but in particular examination objects with a low probability of annihilation of emitted positrons within the examination object. These can in particular be large-surface objects with a simultaneously low volume and/or objects of low material density, in particular biological material, for example leaves or thin sections of organ parts, for example brains.

The positron emitters are added to the object to be examined before or during the measurement, or they are actively taken up before or during the measurement, for example by metabolic processes. For example, $^{18}F$, $^{15}O$, $^{11}C$ or compounds containing these nuclides, such as $^{11}CO_2$ can be used as positron emitters, which can be introduced into the object using known methods. If the object to be examined in its natural state already contains positron emitters, they do not have to be added in addition.

The object used for the examination contains a positron emitter.

A magnetic field is generated according to embodiments of the invention. The properties, in particular the course of the magnetic field, are preferably known or can be determined.

The magnetic field has naturally homogeneous and inhomogeneous regions.

In the homogeneous region, i.e. in the region of constant field strength, the magnetic field lines run parallel in a specific direction. The term homogeneous magnetic field is known to the person skilled in the art.

Inhomogeneous regions of the magnetic field, i.e. regions of spatially varying field strength, can be edge regions of the magnetic field. Here, the magnetic field lines radiate apart from one another or towards each other. For the purposes of the invention, this means the magnetic field range which the person skilled in the art does not consider to be a homogeneous magnetic field.

A magnetic field can be generated by a coil, for example by an electromagnet, but also by a permanent magnet.

The magnetic field strength can in principle be any value, for example in a range from 0.5 to 21 Tesla, in particular 3 to 11 Tesla.

According to embodiments of the invention, the object to be examined is brought into a magnetic field so that the positrons emerging from the examination object run on a spiral path along the magnetic field lines. According to embodiments of the invention, a magnetic field is utilized along whose field lines emitted positrons move on spiral paths due to the Lorentz force. Accordingly, it is possible to utilize both homogeneous magnetic field regions with ideally parallel field lines and inhomogeneous field regions, i.e. for example edge regions of a primarily homogeneous field, and it is irrelevant in this case by which device the magnetic field is generated. Only the field line course must be known or be able to be determined. If the field line curve is known, the trajectories of the emitted positrons are also known directly and can then be clearly traced back to the emission site by extrapolation, which is referred to as tracking method. This is known to the person skilled in the art.

The higher the magnetic field strength, the narrower the paths of the positrons along the magnetic field lines, and the sharper the image becomes, i.e. the so-called gyro radii of the spiral paths decrease with increasing magnetic field strength in a favorable manner.

The object to be examined can be arranged in the homogeneous region of the magnetic field but also in the inhomogeneous region of the magnetic field. It is only critical that positrons emerging from the object to be examined move within the magnetic field. The positrons emerging from the examination object then move along the magnetic field lines on a spiral path.

A flat examination object on the surface of which the magnetic field lines radiate as perpendicularly as possible is particularly preferred. However, deviations from the precisely perpendicular arrangement, which can be deducted, may also be present.

According to embodiments of the invention, a positron absorber is positioned in the magnetic field in such a way that it can absorb the positrons emerging from the object to be examined, which follow the magnetic field. In this case, the positron absorber is positioned such that a plurality or all points of the examination object are each linked to a unique field line, and a plurality or all of these field lines in the further course each have at least one intersection with the positron absorber. In this way, a plurality or all points on the positron absorber can be clearly connected to points of the object and assigned according to the tracking method in the case of a known magnetic field line profile.

Any physical body, which interacts with positrons in such a way that the site of the interaction can be determined so that localization of the point of impact of the positron on the positron absorber is made possible, can be used as the positron absorber.

In one embodiment, the positron absorber is a storage disk, which stores the location information of the impact point as a change of state at the point of impact upon interaction with a positron and, for example, changes color. To this end, for example, a photographic plate, a crystal matrix or a plate coated, for example, with europium atoms, can be used as the storage disk for the direct detection of positrons by the principle of phosphorus imaging. In phosphorus imaging, the positron impact points are localized independently of the $e^+e^-$ annihilation process and the y quanta emitted thereby. Over time, an integration of the change of state of the positrons impacting on the storage disk occurs.

In another embodiment, a positron absorption screen can be used as the positron absorber, which absorbs the positrons that have escaped from the examination object and annihilates them there with an electron in each case. This results in the emission of two 511 keV y-quanta, which are registered by a PET device. A positron absorption screen can be a screen which absorbs positrons and annihilates them with an electron in each case. Hereinafter, the term positron absorption screen without the explanatory supplement is used for this type of positron absorber. A two-dimensional projection of the positrons on the positron absorption screen can thus be generated from the resulting LORs (line of response). This can be done without the need for tomographic reconstruction methods.

In principle, the absorption screen may consist of any material, since it is only dependent upon the $e^+e^-$ annihilation, which can basically take place in any material. Aluminum, titanium, copper, gold, glass, plastic and Plexiglass have proven to be particularly suitable. The y-rays exiting the positron absorption screen can then be detected by a PET device.

Positrons emitted from the object now move along the existing magnetic field lines on spiral paths, so that the positrons ultimately strike at least one particular point of the positron absorption screen, referred to below as the impact point, and can be systematically annihilated there with an electron. In each annihilation process taking place, exactly two 511 keV gamma quanta arise which fly off in opposite directions. Each resulting gamma quantum pair thus defines a unique signal line in three-dimensional space, referred to below as signal line, irrespective of the trajectory of the causative positron and irrespective of the magnetic field direction, and can be determined by a measuring device, which detects both gamma quanta in each case. Any conventional positron emission tomograph is suitable as a measuring device, the precise embodiment of the measuring device being immaterial for the methods according to embodiments of the invention. Each detected signal line has at least or precisely one intersection with the positron absorption screen, which can be calculated by geometric interpolation and marks the respective impact point. Each positron impact point can ultimately be assigned to a direct emission site as a two-dimensional projection within the object by the tracking method. This results directly in a two-dimensional positron-emitter density distribution without the need to use a tomographic reconstruction method.

Furthermore, two positron absorption screens, which are arranged in succession, can also take the place of a single positron absorption screen. Said screens should have a lesser layer thickness than a single positron absorption screen. For example, films such as aluminum films or gold films come into consideration therefor.

In another embodiment, the positron absorber may be an electronic detector. As a spatially resolving detector, the electronic detector can register the location information of the measured signals, which are produced by the impact of the positrons, on the basis of the ionizing effect of the positron. For example, Phoswich detectors can be considered for this purpose, which can additionally be used with scintillator materials, for example plastic scintillators, in combination with classical PET photodetectors.

The positron absorber is preferably planar. However, it can also have other geometries, for example shapes of hollow bodies.

In one embodiment, the positron absorber is positioned in the substantially homogeneous part of the magnetic field. This has the advantage that an image of a 1:1 projection is produced immediately when the object to be examined is likewise located in the homogeneous part of the magnetic field.

Alternatively, however, the positron absorber can also be placed in the inhomogeneous part, for example the diverging region of the magnetic field. This has the consequence that the positrons in the diverging region of the magnetic field are separated from one another and generate an enlarged projection of the examination object to be depicted, so that greater image accuracy ensues in the resulting image due to a magnification. This is particularly advantageous when positron absorption screens are used in conjunction with PET devices, since the limited resolution of the LOR measurement in the measurement of the y-radiation achieves a higher separation sharpness by the widening of the distances.

In this case, the design is such that the positron absorber is located opposite the examination object and at least one partial region of the magnetic field is located therebetween. The positron absorber is preferably oriented parallel to the surface of the examination object. However, it can also be inclined towards the surface of the object to be examined.

Furthermore, it is possible for an examination object to be arranged between two positron absorbers, so that the object with the respective positron absorbers forms two hemispheres into which positrons can be emitted, wherein images can be recorded from both sides of the object to be examined. With inhomogeneity of the object to be examined, this can lead to the positron absorbers located in the different hemispheres registering different images of the distribution of the positron emitters in the object to be examined.

In a further embodiment, between the examination object and the positron absorption screen a further positron absorption screen with openings can be arranged, which functions as a mask and through which a part of the positron current is directed and which for its part acts $e^+e^-$ annihilating in its solid components. As a result, the resolution of the image can be improved by the super resolution method. In addition, a controlled relative displacement of object to positron absorption screen, i.e. measurement in a plurality of different positions, enables a further improvement in the image resolution by means of super resolution methods. In this case, the object to be examined and the positron absorption screen are displaced relative to one another on planes arranged parallel to one another, which are perpendicular or essentially perpendicular to the magnetic field. Preferably, the object is displaced thereby. The object is displaced horizontally and/ or vertically relative to the plane, which the object occupies at a constant distance from the positron absorption screen. In a simpler embodiment, a super resolution method can also be performed without displacing the object relative to the positron absorption screen. The method of super-resolution is known to the person skilled in the art.

In embodiments, successive recordings can also be carried out so that the temporal change of the positron density distribution can be recorded. A dynamic change can then be measured.

The process can also be carried out at a pressure reduced with respect to atmospheric pressure or in a vacuum. This has the advantage that fewer positrons are annihilated on the way to the positron absorber.

For carrying out a method according to an embodiment of the invention, a device is provided which consists of an arrangement of a positron absorber and a magnet. The object to be examined and the positron absorber are located in the known or ascertainable magnetic field of the magnet.

The magnet can be a permanent magnet or a coil, which is supplied with current.

The positron absorber can be a storage plate, which stores the location information of the impact point as a change of state at the impact point upon interaction with a positron and, for example, changes color. To this end, for example, a photographic plate, a crystal matrix or a plate coated, for example, with europium atoms, can be used as the storage plate for the direct detection of positrons by the principle of phosphorus imaging. In phosphorus imaging, the positron impact points are localized independently of the $e^+e^-$ annihilation process and the γ quanta emitted thereby. Over time, an integration of the change of state of the positrons impacting on the storage plate occurs.

An electronic detector is also suitable as a positron absorber. The electronic detector can register the location information of the measured signals, which are produced by striking the positrons, on the basis of the ionizing effect of the positrons. For example, Phoswich detectors can be considered for this purpose, which can additionally be used with scintillator materials, for example plastic scintillators, in combination with classical PET photo detectors.

A positron absorption screen or a positron absorption plate can also serve as a positron absorber, which absorbs positrons and annihilates them each time with an electron, giving rise to two 511 keV γ quanta.

A PET device, which is arranged in such a way that it can detect the γ quanta, is used to register the 511 keV γ quanta.

The positron absorption screen or the positron absorption plate can consist of metals such as aluminum, titanium, copper, gold, but also other materials, such as plastic, glass or Plexiglass, without the naming of these materials being limiting.

At least two positron absorption screens or positron absorption plates can be arranged one behind the other with respect to the object to be examined.

In one embodiment, the object to be examined may be positioned between two positron absorbers so that both sides of the object may be imaged.

The thickness of the positron absorption screens or positron absorption plates can be between 0.1 and 10 mm, for example. The selected thickness may vary from material to material.

A mask with openings can be attached between the object to be examined and the positron absorption screen.

FIG. 1 shows a device for carrying out a method according to an embodiment of the invention. In it, reference sign 1 denotes a PET detector system with PET photodetectors 1a, 1b. The magnetic field BO with reference sign 2, which extends into the PET detector system 1, is shown on the left-hand side. The examination object 3 is located in the magnetic field 2. Emitted positrons 4a, 4b, which strike the positron absorption screen 5, emanate from the object 3 to be examined. The points of impact of the positrons on the positron absorption screen 5 have reference signs 5a and 5b. Gamma quantum pairs 6a 6b, which impact on the PET photodetectors 1a and 1b, emanate from the impact points 5a, 5b.

Figure 2:
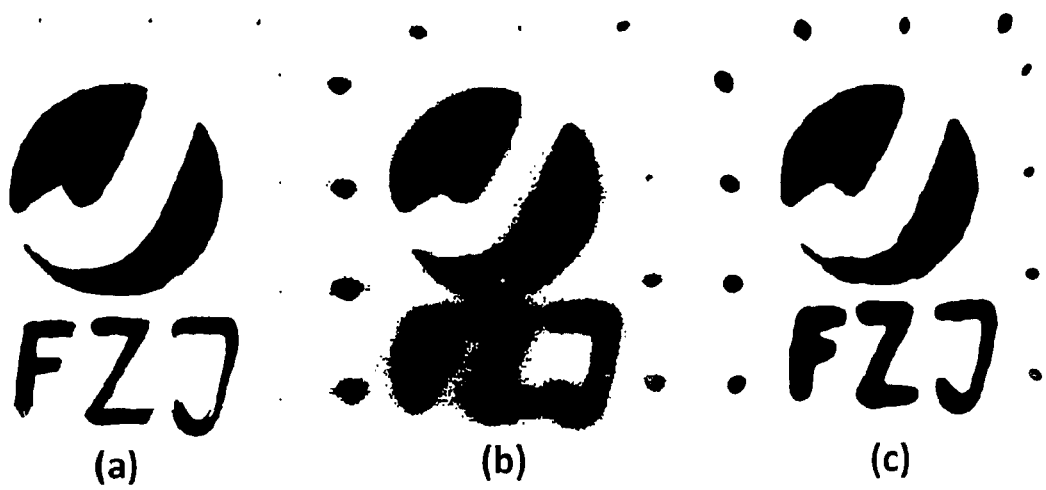
FIGS. 2a, 2b, and 2c illustrate a comparative image recording using a method according to an embodiment of the invention.

FIG. 2 shows 2D images for positron density distribution with the subfigures a) b) and c).

Subfigure a) shows an image which is both characterized in color and is acted upon over its entire area of the color marking with an $^{18}F$ marker as positron emitter, which images the same areas and contours as the color marking.

Subfigure b) shows a calculated image of a method according to an embodiment of the invention by interpolation of the LORs measured with the PET detector system on a planar absorption screen using the positron emitter distribution according to subfigure a).

Subfigure c) shows a tomographic reconstruction of the gamma quantum pairs measured with the PET detector system 1, which were produced at the positron absorption screen 5 at the location of the impact points 5a, 5b, measured when the positron emitter distribution according to subfigure a) was used.

In the following, an embodiment of the invention will be explained using an example, without this limiting interpretation.

Use is made of the effect that, in the presence of a magnetic field, escaping positrons are forced through the Lorentz force $F=q(v*B)$ then acting (on the positively charged positrons) onto a spiral path with a specific gyro radius R along the magnetic field lines. The gyro radius is dependent on the field strength of the magnetic field and on the pulse of the positron relative to the orientation of the magnetic field, i.e. the direction of emission and the speed of flight. For example, an average gyro radius of 0.5 mm results for isotope 18F and a magnetic field strength of 3 Tesla. In the case of a homogeneous magnetic field (BO field), all positrons then move parallel to the BO field vector from their emission point, so that (physically separate from the examination object) localized positrons (in three-dimensional coordinates) contain direct information about their emission location in a plane perpendicular to the BO field vector as a two-dimensional projection. By localizing corresponding positrons in the form of three-dimensional coordinates (x, y, z), two-dimensional positron-emitter density distributions result directly by projection of the determined coordinates onto a plane perpendicular to the BO field vector. Without the presence of a magnetic field, positrons from the respective emission site would be emitted isotropically in all directions and contained no directional information, so that no "tracking" would be possible by extrapolation of the respective positron to the exit location from the examination object.

A conventional positron emission tomograph (PET positron absorber system) is used for localizing the positrons in the form of three-dimensional coordinates (x, y, z), which tomograph is located in a homogeneous magnetic field with axial alignment along the central PET positron absorber axis (FIG. 1). A planar, thin surface ("absorption screen") with the highest possible positron absorption probability (i.e. maximum electron density or minimum penetration depth of the positrons) is brought into the central measuring field of the PET detector for the well-defined enforcement of the annihilation process. The pairs of 511 keV gamma quanta arising from the annihilation process can then be registered by the PET scanner as coincidences. Each measured coincidence corresponds to a unique signal line derived from the coordinates of the (photo) detectors addressed in each case (FIG. 1). The mathematical intersection point of each registered signal line with the plane of the absorption screen results in an impact point of the causative positron in each case as three-dimensional coordinates (x, y, z); wherein the found coordinate pairs (x, y) in the transaxial plane produce a two-dimensional projection of the positron-emitter density distribution, which escaped from the examination object; a quantitative two-dimensional positron-emitter density distribution of all escaped positrons, which are emitted into the hemisphere containing the absorption screen, results therefrom after correction of the geometrical acceptance and the detector efficiencies. In this case, it is irrelevant whether the examination object is located within or beyond the measuring field of the positron emission tomograph.

If the escaping positrons are to be detected in both hemispheres, then correspondingly two absorption screens must be used, wherein the examination object then must be located between the two absorption screens.

Furthermore, dynamic metabolic processes, i.e. temporal changes of the positron-emitter density distribution, can also be observed with this method in that the coincidences registered on the absorption screen (or both absorption screens) are represented in their temporal sequence, exclusively for different measurement time intervals, as two-dimensional projections.

As an extended embodiment of the measuring arrangement, a mask, i.e. an additional absorption screen provided with openings at regular intervals, can be placed between the absorption screen and the examination object. In this case, positrons partially strike the additional mask absorption screen (secondary screen) and are localized there by means of the resulting pairs of annihilation gamma quanta; the other part flies through the openings of the mask absorption screen and can be localized on the closed, original absorption screen (primarily screen). In this way, complementary information can be obtained which can be utilized for the general super resolution method. This is a known method in which the resolution of an image can be improved compared to the maximum achievable resolution contingent upon the PET detector. Additional measurements of the examination object in different positions relative to the secondary screen can contribute to the further enhancement of the image resolution within the framework of the super resolution method. Due to the special combination of secondary screen and primary screen, no positrons are lost by the masking, i.e. the masking can take place without loss of sensitivity. Finally, a resolution, which is better than the upper limit fixed by the positron emission tomograph without "super-resolution", can be achieved by super resolution methods.

In another embodiment of the measuring arrangement, the positron emission tomograph can be positioned in such a way that it is no longer located in the homogeneous region of the magnetic field, but rather in the edge region of the magnetic field where the field lines already diverge and correspondingly radiate outward. If the examination object is now in a region of higher field strength, the positrons move along the field lines on paths that curve outward instead of on parallel paths before they strike the absorption screen. Through this expansion, positrons from two adjacent emission locations strike the absorption screen at an increased distance thereto, so that a better separation of the locations takes place. In this way, a magnification or lens effect can be achieved, which means a general improvement in the image resolution.

Any conventional positron emission tomograph can be used as a measuring device for determining a two-dimensional positron-emitter density distribution, provided that it can be operated in strong magnetic fields. This now applies to all commercial MR/PET hybrid positron absorber systems. In this case, the PET positron absorber can be operated in the respective standard acquisition mode without requiring/using flight-time information for the gamma quantum pairs, which can additionally be made available by the most sophisticated PET detectors. MR/PET hybrid PET detectors therefore provide the essential infrastructure, namely positron emission tomograph and strong magnetic field, in order to be able to implement the method. However, the method is not limited to this device combination. As a single modification that is very simple to achieve, an absorption screen, for example a thin aluminum plate, has to be positioned in the central measuring field of the PET detector system (FIG. 1) so that gamma quantum pairs arising on the absorption screen can be measured. In order to evaluate and generate the two-dimensional projections, only the registered signal lines have to be interpolated to corresponding intersections with the absorption screen (signal line interpolation) (FIG. 2b)). Alternatively, a tomographic reconstruction of the distribution on the absorption screen is also possible (FIG. 2c)). If the examination object is located somewhere in the central measuring field of the PET detector system, a primary image of the examination object (spatially separated from the "absorption screen image", i.e. secondary image) can also be generated for this purpose by tomographic reconstruction. The three-dimensional primary image of the examination object represents quantitative values of the positrons absorbed in the object, while the two-dimensional secondary image, generated either by tomographic reconstruction or by signal line interpolation, enables quantification of all positrons escaping from the examination object. The sum of the two distributions then results in a complete quantification of the positron-emitter density distribution of the object. Depending on the nature of the examination object, i.e. when the two-dimensional positron-emitter density distributions are different for both hemispheres, two absorption screens have to be used, with the examination object therebetween, in order to achieve a complete quantification.

The correct operating principle of the method has already been able to be demonstrated on the 3T TimTrio MR/Brain-PET scanner from Siemens; this is a PET/MR hybrid detector system, which operates at a magnetic field strength of 3 Tesla.

As a possible application, the metabolic processes in plant leaves can be quantified more flexibly and precisely with the novel method. In this way, the plant leaves can be measured contactless and dynamically, which is not possible in this form in existing measuring methods. In particular, the typical thin-layer sheet structures exhibit a significant proportion of escaping positrons, which can be detected and quantified by the novel method.

CITED REFERENCES

[1] Positron Emission Tomography: Basic Sciences, edited by D. L. Bailey, D. W. Townsend, P. E. Valk, M. N. Maisey, Springer, 2005, ISBN 1852337982
[2] See Vandenberghe, P. K. Marsden, PET MRI: a review of challenges and solutions in the development of integrated multimodality imaging, Physics in Medicine and Biology, 2015, Vol. 60, No. 4 Feb. 21; 60 (4): R115 54
[3] C. C. Watson, Positron Attenuation Tomography, US patent 20160116614 A1

The invention claimed is:

1. A method for two-dimensional imaging of a positron emitter distribution in objects to be examined, wherein the object to be examined includes a positron emitter, the method comprising:
   positioning the object to be examined in a magnetic field, wherein the positrons leaving the object to be examined follow the course of the magnetic field and strike a positron absorber which is likewise positioned in the magnetic field and which, upon interaction with the positrons, allows localization of the impact points of the positrons on the positron absorber;
   wherein at least two positron absorption screens are arranged, one behind the other, with respect to an entrance plane of the positrons.

2. The method according to claim 1, wherein a planar positron absorber or a positron absorber with a different geometry is used.

3. The method according to claim 1, wherein the localization of the impact points is carried out by saving the location information as a change of state of the impact points of the positrons on a storage disk.

4. The method according to claim 1, wherein a spatially resolving electronic detector for the direct detection of positrons by ionization is used as the positron absorber.

5. The method according to claim 1, wherein the positron absorber includes a material which absorbs the positrons and annihilates them with an electron, wherein in each case two 511 keV y quanta are produced, which are registered by a PET device.

6. The method according to claim 5, wherein a positron absorption screen or a positron absorption plate made of aluminum, titanium, copper, gold, glass, plastic or Plexiglass is used.

7. The method according to claim 5, wherein a positron absorption screen having a thickness of between 0.1 mm and 10 mm is used.

8. The method according to claim 1, wherein the positron absorber comprises at least one positron absorption screen having the form of a mask with openings.

9. The method according to claim 8, wherein a super resolution method is applied.

10. The method according to claim 1, wherein the object to be examined is positioned between two positron absorbers and images are recorded from both sides of the object to be examined.

11. The method according to claim 1, wherein the positron absorber comprises a side facing the object to be examined, and a center of the side is positioned in an inhomogeneous region of the magnetic field.

12. The method according to claim 11, wherein the magnetic field defines a homogeneous region and the inhomogeneous region and the positron absorber is not located in the homogeneous region.

13. A device for carrying out the method according to claim 1 with a magnet, wherein a positron absorber is positioned in the magnetic field of the magnet, the positron absorber comprising a component from the following group:
   a) storage disk, which stores the location information about the impact points of the positrons by a change of state on the storage disk,
   b) electronic detector,
   c) positron absorption screen, which absorbs positrons and in each case annihilates them with an electron.

14. The device according to claim 13, wherein the storage disk according to variant a) is a photographic plate, a crystal matrix or a plate coated with europium atoms.

15. The device according to claim 13, wherein a positron absorption screen according to variant c) is assigned a PET detector system, which detects the y quanta arising by annihilation.

16. The device according to claim 15, wherein at least two positron absorption screens are disposed in the magnetic field of the magnet.

17. The device according to claim 15, wherein at least one positron absorption screen is in the form of a mask having openings.

18. A method for two-dimensional imaging of a positron emitter distribution in objects to be examined, wherein the object to be examined includes a positron emitter, the method comprising:
   positioning the object to be examined in a magnetic field, wherein the positrons leaving the object to be examined follow the course of the magnetic field and strike a positron absorber which is likewise positioned in the magnetic field and which, upon interaction with the positrons, allows localization of the impact points of the positrons on the positron absorber;
   wherein at least one positron absorption screen having the form of a mask with openings is used.

19. A method for two-dimensional imaging of a positron emitter distribution in objects to be examined, wherein the object to be examined includes a positron emitter, the method comprising:
   positioning the object to be examined in a magnetic field, wherein the positrons leaving the object to be examined follow the course of the magnetic field and strike a positron absorber which is likewise positioned in the magnetic field and which, upon interaction with the positrons, allows localization of the impact points of the positrons on the positron absorber; and
   wherein the positron absorber is exclusively disposed in a homogeneous region of the magnetic field.

20. The method of claim 19, wherein a magnet generates the magnetic field and the positron absorber is disposed within the magnet.

* * * * *